United States Patent [19]

Hazel et al.

[11] 4,275,026

[45] Jun. 23, 1981

[54] METHOD FOR PREPARING TITANIUM DIBORIDE SHAPES

[75] Inventors: John G. Hazel, Barberton; Roger A. Steiger, Canal Fulton, both of Ohio

[73] Assignee: PPG Industries, Inc., Pittsburgh, Pa.

[21] Appl. No.: 90,840

[22] Filed: Nov. 2, 1979

[51] Int. Cl.$^3$ .............................................. C04B 35/58
[52] U.S. Cl. ..................................... 264/67; 106/73.3
[58] Field of Search ................... 264/56, 67, 109, 118, 264/125; 106/55, 57, 73.3

[56] References Cited

U.S. PATENT DOCUMENTS

| | | | |
|---|---|---|---|
| 2,735,155 | 2/1956 | Glaser | 106/55 |
| 2,802,748 | 8/1957 | Glaser | 106/55 |
| 3,003,885 | 10/1961 | Mandorf | 106/73.3 |
| 3,028,324 | 4/1962 | Ransley | 106/73.3 |
| 3,052,538 | 9/1962 | Jech et al. | 106/73.3 |
| 3,215,545 | 11/1965 | Reidl et al. | 106/55 |
| 3,314,876 | 4/1967 | Ransley | 106/55 |
| 3,937,619 | 2/1976 | Clougherty | 264/125 |
| 4,007,251 | 2/1977 | Isaksson et al. | 106/73.3 |
| 4,017,426 | 4/1977 | Carbonnel | 106/73.7 |
| 4,097,567 | 6/1978 | Cebulak et al. | 106/73.3 |
| 4,108,670 | 8/1978 | Steiger et al. | 106/73.3 |

FOREIGN PATENT DOCUMENTS

39-9052 5/1964 Japan .

OTHER PUBLICATIONS

Sintering and Recrystallization of ZRC–ZRB$_2$ Compacts by V. M. Gropyanou et al., Soviet Powder Metallurgy, Jul. 1968.

*Primary Examiner*—John Parrish
*Attorney, Agent, or Firm*—Irwin M. Stein

[57] ABSTRACT

Cold formed and sintered titanium diboride shapes of high density are prepared by grinding particulate carbothermic titanium diboride in a mill having non-contaminating grinding media in the presence of an inert, substantially oxygen-free liquid grinding aid to form finely-divided titanium diboride powder having a surface area of at least about 3 square meters per gram, cold forming the finely-divided titanium diboride powder into a desired shape and sintering the shape to produce a titanium diboride article having a density of at least 95 percent of the theoretical density of titanium diboride.

18 Claims, No Drawings

METHOD FOR PREPARING TITANIUM DIBORIDE SHAPES

DESCRIPTION OF THE INVENTION

Articles of titanium diboride have been proposed for use in electrolytic cells for the production or purification of aluminum, e.g., as current conducting elements. Because of the severe service conditions present during operation of such electrolytic cells, e.g., the Hall-Heroult electrolytic cell, it is believed that the titanium diboride articles used in such cells should be of high density, e.g., greater than 90 and preferably greater than 95 percent of the theoretical density of titanium diboride.

Titanium diboride articles of high density can be produced by hot pressing, i.e., the simultaneous application of heat and pressure, titanium diboride powder. Hot pressing adds considerably to the expense of the resulting articles and is shape limited. More recently, it has been found that submicron titanium diboride prepared by gas phase reaction of titanium and boron reactants, e.g., titanium tetrachloride and boron trichloride, and optionally containing a carbon source additive, can be cold formed and sintered to articles of high density. See, for example, German Offenlegungsschrift No. 25 23 423.

The aforesaid submicron titanium diboride powder is more expensive to produce than carbothermic titanium diboride. However, titanium diboride articles prepared by cold forming and sintering carbothermic titanium diboride powder have a disadvantage of having relatively high porosity, e.g., up to 20 percent or more, and, therefore, permeable to the principal constituents found in the aluminum reduction or purification cell, e.g., molten aluminum and cryolite. The failure of carbothermic titanium diboride articles in aluminum cell service has been attributed to such porosity. It is desirous, therefore, to produce titanium diboride articles of high density from carbothermic titanium diboride powder.

It has now been found that cold formed and sintered titanium diboride articles of high density can be obtained by the steps of grinding particulate carbothermic titanium diboride in the presence of an inert substantially oxygen-free liquid grinding aid in a mill having non-contaminating grinding media for a time sufficient to reduce the particulate titanium diboride to a finely-divided powder having a surface area of at least about 3 square meters per gram, cold forming the finely-divided titanium diboride powder into the desired shape and sintering the so-formed shape at temperatures of at least 1800° C. for a time sufficient to produce a titanium diboride article having a density of at least 95 percent of the theoretical density of titanium diboride.

DETAILED DESCRIPTION OF THE INVENTION

Carbothermic titanium diboride used as the starting material for the process described herein is particulate titanium diboride produced by the so-called "carbothermic process". The carbothermic process may involve any one of several reactions, one of which involves reacting titanium dioxide (anatase or rutile), an oxide of boron, and carbon, such as in accordance with the following balanced equation:

$$TiO_2 + B_2O_3 + 5C \rightarrow TiB_2 + 5CO \tag{1}$$

An alternative reaction is one in which the boron is supplied in the form of boron carbide (nominally $B_4C$) as in the following equation:

$$2TiO_2 + B_4C + 3C \rightarrow 2TiB_2 + 4CO \tag{2}$$

Elemental boron can also be used in accordance with the equation:

$$TiO_2 + 2B + 2C \rightarrow TiB_2 + 2CO \tag{3}$$

A further alternative reaction that can be employed utilizes titanium carbide and boron carbide in accordance with the following equation:

$$TiC + TiO_2 + B_4C \rightarrow 2TiB_2 + 2CO \tag{4}$$

Reactions represented by equations 2, 3 and 4 are variants of the basic reaction recited in equation (1).

The titanium, boron and carbon reactants are mixed and formed into a charge which is introduced into a furnace, e.g., electric or induction, and heated to temperatures of from about 2000° C. to about 2500° C. The resulting product is a hard sintered mass of material. Titanium diboride product is separated from the sintered mass and mechanically ground to form a particulate titanium diboride powder.

The particulate titanium diboride powder produced by the carbothermic process contains as impurities, materials resulting from the $TiB_2$ forming reaction and the subsequent size reduction. Typical of the principal impurities are graphite and/or carbon in the form of free carbon or chemically combined carbon, e.g., titanium carbide, oxygen, nitrogen, iron and other ferrous metals some of which results from abrasion of grinding media surfaces during mechanical milling. The total amount of such impurities can vary depending upon the source. It is not uncommon for such impurities to represent up to about 5 weight percent of the particulate powder.

Particulate carbothermic titanium diboride powder used as the starting material in the present process has a surface area of less than about one square meter per gram. The titanium diboride particles comprising the particulate powder can range from about 0.001 to 100 microns or more, depending on the commercial source of the powder. The particle size range or distribution of the particulate titanium diboride powder is not critical. The particle size distribution of carbothermic titanium diboride is wide as a result of the formation of fines during the size reduction step used in the process of producing particulate carbothermic titanium diboride powder. Such fines are irregular fragments that have been chipped or ground from the principal titanium diboride particles. They represent in number a large proportion of the particles of the particulate powder; but, represent a small percentage by weight of the powder. For example, it was found that the fines of one commercial source of particulate carbothermic titanium diboride powder represented by number about 77 percent of the particles of the powder; but, such fines represented less than 0.3 percent by weight of the powder. That powder had a weight median particle size of about 11.5 microns.

In accordance with the present process, particulate carbothermic titanium diboride is ground in a mill having non-contaminating grinding media and with an inert, substantially oxygen-free liquid grinding aid. The grinding can be performed in any suitable crushing or grinding mill, such as a ball, pebble, rod, or tube mill, a hammer (impact) mill or a disk (attrition) mill. The grinding can be performed as a batch or continuous process and can involve open-circuit or closed-circuit grinding. The grinding can be combined with size classification either within the mill or in an independent piece of apparatus.

In order to avoid contamination of the particulate titanium diboride powder that is to be ground beyond that already present in the powder as produced, the grinding media of the mill, i.e., the surfaces of the mill applying the grinding forces to the powder, e.g., the walls of the mill, balls, pebbles, rods, hammers, etc. of the mill, should be constructed of an inert and substantially non-contaminating material. Metallic or metal carbide grinding media, such as iron, steel, or metal carbides, e.g., tungsten carbide, abrade significantly during the milling operation and the abraded material becomes commingled with the powder. Such contaminating grinding media should be avoided. While small amounts of impurities from the grinding media can be tolerated in the powder, the amount of impurity pickup due to the grinding operation cannot be satisfactorily controlled and should therefore be avoided where possible. Preferably, the surfaces of the mill and other grinding media contacting the particulate powder are constructed of a non-contaminating material such as titanium diboride or zirconium diboride. The grinding media can be coated or clad with a coating of a non-contaminating material such as the diborides of titanium or zirconium. One method of obtaining such clad surfaces is by flame spraying the surfaces of the grinding media with titanium or zirconium diboride. Preferably, the grinding media is titanium diboride.

In accordance with the present process, particulate titanium diboride powder is wet ground in a mill utilizing an inert, substantially oxygen-free (elemental or chemically combined) liquid grinding aid. Of particular utility as the grinding aid are liquid hydrocarbons and halogenated hydrocarbons, e.g., chlorinated hydrocarbons. The liquid grinding aid should be liquid at ambient temperatures and readily volatile at elevated temperatures to facilitate the removal of the grinding aid subsequent to the milling step. Liquid hydrocarbons of from 5 to 8 carbon atoms and halogenated hydrocarbons of from 2 to 4 carbon atoms can be utilized advantageously.

From the evidence at hand, it is believed that the presence of oxygen-containing compounds in the grinding aid have an adverse effect on the densification of the finely-divided carbothermic titanium diboride powder produced by the above-described grinding. Consequently, grinding aids such as alcohols should be avoided. Further, certain halogenated hydrocarbons, e.g., chlorinated hydrocarbons such as methyl chloroform and perchloroethylene, are sold commercially with stabilizer systems which may contain oxygen-containing compounds. Accordingly, halogenated hydrocarbons without such oxygen-containing additives are preferably used in the process of the present invention.

The amount of grinding aid used during grinding of the particulate carbothermic titanium diboride powder should be sufficient to maintain the titanium diboride powder in the mill in a deflocculated or deagglomerated condition. The precise amount of grinding aid required will vary depending on the grinding equipment used and the grinding aid. However, one skilled in the art will be able to determine the amount of grinding aid required by simple trial and error. The amount of grinding aid used is not critical provided that enough is used to maintain the titanium diboride in a deflocculated state, i.e., in a fluid or flowable condition, e.g., as a slurry.

The particulate carbothermic titanium diboride powder is ground in the mill for a time sufficient to reduce the particulate titanium diboride to a finely-divided powder having a surface area of at least about three square meters per gram, preferably at least five square meters per gram. As a general rule, the longer the milling time—the higher the surface area of the titanium diboride powder produced. However, with finely-divided powder, after prolonged periods of milling, the increase in surface area, if any, is difficult to measure. Consequently, as a practical matter, it is expected that surface areas of no greater than about 15 square meters per gram will be attained even with extensive milling. The finely-divided, milled carbothermic titanium diboride powder produced in the milling step will consequently have a surface area of between about 3 and 15, e.g., 5 and 10, square meters per gram. As used in the present specification and claims, the surface area is the value obtained by the method of Brunauer, Emmett and Teller, J. Am. Chem. Soc., 60, 309 (1938). This method, which is often referred to as the B.E.T. method, measures the absolute surface area of a material by measuring the amount of gas adsorbed under special conditions of low temperature and pressure. The B.E.T. surface areas reported herein were obtained using nitrogen as the gas adsorbed and liquid nitrogen temperatures ($-196°$ C.) at a pressure of 150 millimeter of mercury (0.2 relative pressure).

The increase in surface area as a result of grinding the particulate carbothermic titanium diboride powder occurs principally as a result of the formation of finely-divided fragments. These fragments comprise irregular pieces of the principal particles that have been chipped or ground away from the edge or face of the principal particle. The particle size range of the finely-divided milled carbothermic titanium diboride powder can vary from about 0.001 to about 30 microns or more. Naturally, the more extensive or efficient the grinding, the smaller the number of large particles, i.e., 10 microns and larger, present in the milled powder. Because of the nature of the grinding process, a large number of small particles are formed that, however, do not represent a major proportion of the weight of the powder but which serve to increase the surface area. Typically, at least about 90 percent of the particles of the finely-divided milled carbothermic titanium diboride powder prepared by the present process will be less than about 0.5 microns, which particles will account for less than about 30 percent by weight of the powder. The weight median particle size of the milled powder is typically less than 5 microns, preferably less than 2 microns, e.g., between about 0.5 and about 1.8 microns.

The time required to produce the above-described, finely-divided carbothermic titanium diboride powder will vary depending on the type of mill used and the efficiency of the mill. Grinding times can vary from as little as 5 hours to as much as 500 hours; but more typically will range between about 20 hours and 100 hours in industrial sized mills.

Following the milling step, the finely-divided carbothermic titanium diboride is removed from the mill and preferably filtered through a screen to remove the grinding media, e.g., balls, and any very large particles or agglomerates that may be present. The screen size is not critical as the screen functions only to retain the grinding media and large particles, while permitting the free flow of powder slurry. Subsequently, the slurry of ground titanium diboride powder is heated to evaporate the grinding aid. Heating can be readily accomplished in a rotary vacuum evaporator or equivalent evaporating equipment. The evaporated grinding aid can be condensed and recycled to the mill. The milled titanium diboride powder substantially free of grinding aid is preferably screened, e.g., through a 20 or 32 Tyler mesh screen, to break-up or remove any agglomerates present in the powder.

Commonly, wax or some other suitable binder is incorporated into the powder by techniques such as spray drying, physical blending, etc. and the resulting powder-binder blend molded into the desired shape. Typically, between about 0.5 and about 5 weight percent of binder material is applied to the powder.

The dry, finely-divided carbothermic titanium diboride powder can then be cold formed into a desired shape and sintered to produce a titanium diboride article having a density of at least 95 percent of the theoretical density of titanium diboride. The term "cold formed" as used herein means that the titanium diboride powder is compacted and shaped, as by pressing or molding, prior to the sintering operation. Cold forming is distinguished from hot forming or hot pressing in which the shaping and pressing by application of pressure is conducted simultaneously with the sintering step. For simple shapes such as round or rectangular plates or the like, the finely-divided titanium diboride powder can be pressed in matched metal dies. For more complex shapes, such as spheres, rods, bars, solid or hollow cylinders, flexible, e.g., rubber, molds are useful. For complicated shapes, slip-casting, tape casting, pressure casting, compression casting, or extrusion or injection molding, can be used to cold form the article. Isostatic compaction is preferred.

Consolidation, i.e., cold forming, of the milled titanium diboride powder is performed either at ambient temperature or at slightly elevated temperatures; but, significantly less than sintering temperatures. The pressure applied is in the range of 0.5 to 50 tons per square inch, e.g., 2 to 10 tons per square inch. Prior to sintering, it may be necessary to first heat the cold formed shape at temperatures sufficient to remove any organic binder material (if used). Heating at about 200° to 400° C. for about one hour in a vacuum or inert atmosphere is usually sufficient to remove such binder materials.

The sintering can be performed either in a vacuum or in an inert atmosphere. As the inert atmosphere, there can be used nitrogen, argon, helium or other such inert gas. Sintering temperatures will typically range between about 1800° C. and 2500° C., e.g., 1950° C. and 2300° C. The time at sintering temperature will commonly vary from about 0.5 to about 2 hours, e.g., 1 hour. The rate of temperature increase to and decrease from the maximum sintering temperature is usually fairly uniform.

The sintered carbothermic titanium diboride article produced in accordance with the above-described procedure has a density of at least 95 and preferably at least 98 percent of the theoretical density of titanium diboride. In addition to utility in aluminum reduction and refining electrolytic cells, such titanium diboride articles can be used in other applications for which titanium diboride is known, e.g., containers for molten metal.

A solid carbon-containing additive, e.g., elemental carbon, metal carbide or mixtures thereof, can be added to the particulate carbothermic titanium diboride ground in the mill or, if sufficiently fine in size, added to the milled powder. German patent Offenlegungsschrift No. 25 23 423 describes the addition of such additives to submicron titanium diboride powder. Typically, the total carbon content of the titanium diboride powder will range from about 0.1 to about 5 weight percent, more typically between above 0.1 and about 2, e.g., between about 0.3 and about 1, weight percent of the titanium diboride powder. As the particulate titanium diboride powder already contains carbon, no such addition may be required or the amount of carbon-containing additive used may be reduced because of the presence of carbon in the particulate titanium diboride powder. As used herein, the terms "carbon-containing additive", "carbon" or "total carbon" are intended to mean the carbon present as elemental carbon and/or chemically combined carbon, e.g., as a metal carbide.

Metal carbides that can be used as the carbon-containing additive include the carbides of boron, silicon and the refractory metals of groups $4b$, $5b$, and $6b$ of the Periodic Table Of The Elements as found on the back cover of the Handbook of Chemistry and Physics, 45th Edition, published by The Chemical Rubber Co., 1964. Examples of such carbides include hafnium carbide, titanium carbide, tantalum carbide, zirconium carbide, tungsten carbide, boron carbide, silicon carbide, and mixtures of such carbides.

The present invention is more fully described in the following examples which are intended as illustrative only since numerous modifications and variations therein will be apparent to those skilled in the art.

EXAMPLE I

Particulate carbothermic titanium diboride powder (minus 325 mesh) was obtained from a commercial supplier of such powder. Analyses of the powder, as reported by the supplier and as determined independently, are tabulated in Table I.

TABLE I

| CARBOTHERMIC TIB$_2$ POWDER | | |
|---|---|---|
| | Supplier Reported Analysis, % | Independent Analysis, % |
| Titanium | 69.2 | —$^a$ |
| Boron | 30.8 | 32.6 |
| Carbon | 0.24 | 0.27 |
| Oxygen | 0.35 | 0.43 |
| Nitrogen | 0.05 | — |
| Iron | 0.50 | — |
| Surface Area | −325 mesh | 0.8–1.1 m$^2$/g |

$^a$Not determined.

Inspection of the aforesaid particulate carbothermic titanium diboride, as received, with a Zeiss TGZ-3 Particle Size Analyzer indicated that about 77 percent of the particles were less than 0.17 microns, which particles represented only about 0.28 weight percent of the powder. Over 98 weight percent of the powder was represented by particles greater than 1 micron. Particles greater than about 4 microns comprised about 90 percent of the powder. The weight median particle size was calculated to be about 11.5 microns. The number median particle size was calculated to be about 0.15 microns.

A portion of the as received powder was isostatically pressed at 20,000 pounds per square inch into a ¾ inch diameter×5 inch rod. The mold for the rod was filled in a dry box where the level of oxygen and moisture were less than 10 parts per million. The cold formed rod was removed from the mold and found to be in five sections. All five sections were sintered in a vacuum furnace at 2100° C. for one hour at temperature. The sintered density of the five sections of the rod ranged from 75.4 to 76.8 percent (an average of 76.2 percent) of the theoretical density of titanium diboride.

EXAMPLE II

About 100 grams of the particulate carbothermic titanium diboride powder of Example I was charged in a dry box to a tubular titanium diboride mill three inches in diameter by six inches in length. The active grinding media were ¼ inch diameter×½ inch long titanium diboride pellets. Liquid heptane (about 150 milliliters) was added to the mill to a level just above the level of the pellets. The mill was closed, taken from the dry box and placed on a roll mill where it was allowed to rotate for 22 hours.

After the aforesaid grinding, the mill was returned to the dry box, opened and the heptane slurry of titanium diboride powder poured onto a screen to separate the slurry from the grinding pellets. The slurry was washed with heptane into a one-liter, single-necked, round bottom flask which was stoppered and removed from the dry box. The flask was attached to a Buchler vacuum flash evaporator and the system vacuum turned on to evacuate the system. The flask was heated to about 70°–80° C. to assist the evaporation of heptane from the milled powder. When the powder was judged to be completely dry, the vacuum system was broken to nitrogen. The evaporation flask was returned to the dry box and the dry powder screened through a 60 Tyler mesh screen.

The milled powder was determined to have a surface area of about 0.8 square meters per gram. Some physical fracturing of the particles was evidenced by examination of scanning electron micrograph (SEM) photographs. An estimate of the particle sizes present in the milled powder was determined by visual observation under a microscope to be in the range of from 0.001 to 20 microns. A portion of the milled powder was cold formed into a ¾ inch diameter by 5 inches long rod and sintered in accordance with the procedure of Example I. The density of the sintered rod was found to be 86.8 percent of the theoretical density of titanium diboride.

EXAMPLE III

The procedure of Example II was repeated except that the milling time was 92 hours. The surface area of the milled powder was found to be 0.4 square meters per gram and an estimate of the particle size range of the milled powder as determined by a visual count under a microscope was from 0.001 to about 17 microns. Some physical fracturing of the particles was evidenced by examination of SEM photographs. However, the sensitivity of the B.E.T. surface area method, which is about 0.5 $m^2/g$ at the surface area involved, i.e., about 1 $m^2/g$, does not reflect an increase in surface area for the milled powder. The ¾ inch×5 inch rod prepared with the milled powder was found to have a density of 92.0 percent of the theoretical density of titanium diboride.

EXAMPLE IV 400.0 grams of the particulate carbothermic titanium diboride powder of Example I was charged to a titanium diboride lined mill 5 inches diameter×6 inches long. The grinding media were titanium diboride pellets about 0.4 inch diameter×⅜–½ inch length. 500 milliliters of heptane were added to the mill, thereby covering the titanium diboride pellets and powder. The mill was closed and placed on a roller and maintained there for 97 hours. The mill was opened and the powder found to be wet but somewhat caked in the mill. An additional 500 milliliters of heptane were added to the mill and the mill returned to the rollers. After a total milling time of 101.5 hours, the mill was removed to the dry box and the slurry of milled powder poured into a four liter beaker through an 8 Tyler mesh screen to separate the grinding pellets. The pellets were rinsed with heptane. A small amount of hexane was also used to finish rinsing the pellets when the supply of heptane became exhausted. The milled powder was allowed to settle.

The clear supernatant heptane was siphoned from the four liter beaker and the powder-containing heel washed with heptane into a two liter single necked, round bottom flask. The flask was attached to a Buchler vacuum rotary evaporator and heated to about 45°–50° C. to remove the remaining heptane solvent. After removal of the solvent, the vacuum was broken to nitrogen and the dried powder screened through a 20 Tyler mesh screen to break powder agglomerates that may have formed.

The surface area of the milled powder was determined to be about 2.6 square meters per gram. Examination of the powder with the Zeiss particle size analyzer indicated that about 80 percent of the particles were less than 0.07 microns, which particles represented about 0.26 weight percent of the powder. About 97 weight percent of the powder was composed of particles greater than 1 micron. Particles greater than 4 microns comprised about 55 percent of the powder. The weight median particle size was calculated to be about 4.47 microns. The number median particle size was calculated to be about 0.06 microns. A 0.75 inch×2.0 inch rod, which was prepared from the milled powder by isostatic pressing at 20,000 psi and sintering the resulting shape at 2100° C. for one hour, was found to have a density of about 94.0 percent of the theoretical density of titanium diboride.

EXAMPLE V

The procedure of Example IV was repeated except that 300 grams of the particulate carbothermic titanium diboride of Example I was charged to the mill with 750 milliliters of heptane and milled for 168 hours. The milled and dried powder was passed through a 32 Tyler mesh screen to break up any powder agglomerates that may have formed. The surface area of the milled powder was determined to be about 9.9 square meters per gram and inspection of the powder with the Zeiss particle size analyzer indicated that about 34 percent of the particles were less than 0.17 microns, which particles represented about 0.23 weight percent of the powder. About 52 weight percent of the powder was composed of particles greater than 1 micron. About 21 weight percent of the powder was composed of particles greater than 2 microns. The weight median particle size was calculated to be about 1.03 microns. The number median particle size was calculated to be about 0.19 microns. The rod prepared by isostatically pressing the milled powder, and sintering the cold formed rod at 2100° C. for one hour was found to have a density of about 96.2 percent of the theoretical density for titanium diboride.

The data of Examples I–V show that the density of cold formed and sintered shapes prepared from particulate carbothermic titanium diboride powder can be significantly increased by wet milling the particulate powder in a non-contaminating (titanium diboride) mill with an inert (hydrocarbon) grinding aid.

EXAMPLE VI

The procedure of Example V was repeated except that the grinding aid was 700 milliliters of stabilized methyl chloroform. The stabilizers fo the methyl chloroform included an alkaline oxide and an alcohol. After milling for 168 hours, the milled powder was recovered as described in Example V except that stabilized methyl chloroform was used to rinse the grinding pellets. The dried milled powder was screened through a 20 Tyler mesh screen to break up powder aggregates. The surface area of the milled powder was determined to be about 4.9 square meters per gram and inspection of the powder by the Zeiss particle size analyzer indicated that about 26 percent of the particles were less than 0.17 microns, which particles represented about 1.15 weight percent of the powder. About 57 weight percent of the powder was composed of particles greater than 1 micron. About 31 weight percent of the powder was composed of particles greater than 2 microns. The weight median particle size was calculated to be about 1.30 microns. The number median particle size was calculated to be about 0.21 microns. A 0.75 inch×2.0 inch rod prepared by cold pressing the milled powder at 20,000 psi and sintering at 2100° C. for one hour had a density of 90.3 percent of the theoretical density of titanium diboride.

EXAMPLE VII

The procedure of Example VI was used except that dried, unstabilized methyl chloroform was used as the grinding aid. After milling for 168 hours, the milled powder was recovered as described in Example VI except that the dry powder was screened through a 32 Tyler mesh screen to remove the powder agglomerates. The surface area of the milled powder was determined to be about 7.2 square meters per gram and analysis of the particles by the Zeiss particle size analyzer indicated that about 32 percent of the particles were less than 0.17 microns, which particles represented about 0.89 weight percent of the powder. About 78 weight percent of the powder was composed of particles greater than 1 micron. About 21 weight percent of the powder was composed of particles greater than 2 microns. The weight median particle size was calculated to be about 1.59 microns. The number median particle size was calculated to be about 0.20 microns. A 0.75 inch×2.0 inch rod prepared by cold forming at 20,000 psi and sintering at 2100° C. for one hour had a density of 98.3 percent of the theoretical density for titanium diboride.

EXAMPLE VIII

The procedure of Example VII was repeated except that the powder was milled for 483.5 hours. After milling, the methyl chloroform-titanium diboride slurry was removed from the mill and passed through a 12 Tyler mesh screen and the grinding pellets washed with the methyl chloroform. The titanium diboride grinding pellets were found to have lost 19.0 grams during the milling.

The milled titanium diboride did not readily settle and consequently the entire slurry of milled powder and methyl chloroform removed from the mill together with the washings were subjected to evaporation. The dried powder was screened through a 20 Tyler mesh screen to break powder agglomerates formed during the grinding and drying operations. The surface area of the milled powder was determined to be about 8.0 square meters per gram and inspection of the powder by the Zeiss particle size analyzer indicated that about 79 percent of the particles were less than 0.07 microns, which particles represented about 3.0 weight percent of the powder. About 30 weight percent of the powder was composed of particles greater than 1 micron. The weight median particle size of the powder was calculated to be about 0.78 microns. The number median particle size of the powder was calculated to be about 0.06 microns. A 0.75 inch×2.0 inch rod prepared by isostatically pressing the milled powder at 20,000 psi and sintering the green rod at 2100° C. was found to have a density of 98.4 percent of the theoretical density for titanium diboride.

The data of Examples VI–VIII show that the density of cold formed and sintered titanium diboride shapes prepared from carbothermic titanium diboride can be improved by milling the particulate carbothermic powder with a non-oxygen containing grinding aid.

Although the present process has been described with reference to specific details of certain embodiments thereof, it is not intended that such details should be regarded as limitations upon the scope of the invention except as and to the extent that they are included in the accompanying claims.

What is claimed is:
1. A method for preparing cold formed and sintered titanium diboride shapes of high density, which comprises the steps of:
   a. grinding particulate carbothermic titanium diboride having a surface area of less than about one square meter per gram in the presence of an inert substantially oxygen-free liquid grinding aid in a mill having non-contaminating grinding media for a time sufficient to reduce the particulate titanium diboride to a finely-divided powder having a surface area of at least about three square meters per gram;
   b. cold forming the finely-divided titanium diboride powder into a desired shape; and
   c. sintering the so-formed shape at temperatures of at least 1800° C. to produce a titanium diboride article having a density of at least about 95 percent of the theoretical density of titanium diboride.

2. The method of claim 1 wherein the non-contaminating grinding media is titanium diboride or zirconium diboride.

3. The method of claims 1 or 2 wherein the liquid grinding aid is selected from the group consisting of liquid hydrocarbons of from 5 to 8 carbon atoms and halogenated hydrocarbons of from 2 to 4 carbon atoms.

4. The method of claim 3 wherein the halogenated hydrocarbon is a chlorinated hydrocarbon.

5. The method of claims 1 or 2 wherein the surface area of the finely-divided powder is between about 3 and 15 square meters per gram.

6. The method of claim 5 wherein the surface area is between 5 and 10 square meters per gram.

7. The method of claims 1 or 2 wherein the grinding time ranges from about 5 to about 500 hours.

8. The method of claim 7 wherein the grinding time ranges from about 20 to about 100 hours.

9. The method of claims 1 or 2 wherein the sintering temperature ranges between 1800° C. an 2500° C.

10. The method of claim 9 wherein the sintering temperature ranges between 1950° C. and 2300° C.

11. The method of claim 3 wherein the surface area of the finely-divided powder is between about 3 and 15 square meters per gram, the grinding time is between 5 and 500 hours and the sintering temperature ranges between 1800° C. and 2500° C.

12. The method of claim 11 wherein the halogenated hydrocarbon is a chlorinated hydrocarbon.

13. The method of claim 3 wherein the surface area of the finely-divided powder is between about 5 and 10 square meters per gram, the grinding time is between about 20 and 100 hours and the sintering temperature ranges between 1950° C. and 2300° C.

14. The method of claim 13 wherein the halogenated hydrocarbon is a chlorinated hydrocarbon.

15. The method of claim 5 wherein the finely-divided powder contains from above 0.1 to about 5 weight percent of solid carbon-containing additive selected from the group consisting of elemental carbon, the carbides of boron, silicon and refractory metals of groups 4*b*, 5*b* and 6*b*, and mixtures of elemental carbon and such metal carbides.

16. The method of claim 15 wherein the finely-divided powder contains from above 0.1 to about 2 weight percent of the solid carbon-containing additive.

17. The method of claim 15 wherein the carbon additive is selected from the group consisting of elemental carbon, titanium carbide or mixtures thereof.

18. The method of claim 16 wherein the carbon additive is selected from the group consisting of elemental carbon, titanium carbide or mixtures thereof.

* * * * *